Oct. 21, 1947.   E. M. VAN DORNICK   2,429,247
METHOD AND APPARATUS FOR FLUID CATALYTIC CONVERSION
Filed Aug. 2, 1944   2 Sheets—Sheet 1

INVENTOR
EDWARD M. VAN DORNICK
BY
Lee Allan Swem
ATTORNEY

Patented Oct. 21, 1947

2,429,247

UNITED STATES PATENT OFFICE 2,429,247

METHOD AND APPARATUS FOR FLUID CATALYTIC CONVERSION

Edward M. Van Dornick, New York, N. Y., assignor to Foster Wheeler Corporation, New York, N. Y., a corporation of New York Application August 2, 1944, Serial No. 547,711

24 Claims. (Cl. 196—52)

1

This invention relates to fluid catalytic conversion of composite liquids and more particularly pertains to the recovery of catalyst in the catalytic cracking of hydrocarbon oils.

In a unit for fluid catalytic cracking of hydrocarbon oils, it is the usual practice to recover catalyst entrained in flue gases from the regenerator by passing the gases through cyclone separators and then through a Cottrell precipitator. The use of cyclone separators and a Cottrell precipitator has not been entirely satisfactory because the catalyst losses are high due to unsatisfactory separation of the entrained catalyst from the flue gases and because considerable maintenance is required in the operation of a Cottrell precipitator. It has also been the practice to recover catalyst fines from hydrocarbon vapors produced in the reactor in the lower portion of the fractionating tower by utilizing a circulating quench oil as a cooling and scrubbing medium, the product yield of the slurry quench oil thereafter being fed to the reactor. Feeding of the slurry quench oil to the reactor results in a disproportionately high carbon yield with a negligible yield of desirable products resulting from the cracking of the recirculated slurry oil. While the high carbon yield is reduced by passing the quench slurry oil from the fractionator through a settling system before passing it to the reactor, this results in only the highly concentrated slurry oil (approximately only 25 vol. per cent) being returned to the reactor.

The present invention provides a method of and apparatus for the recovery of substantially all the catalyst used in a unit for the fluid catalytic cracking of hydrocarbon oils.

Figure 1:
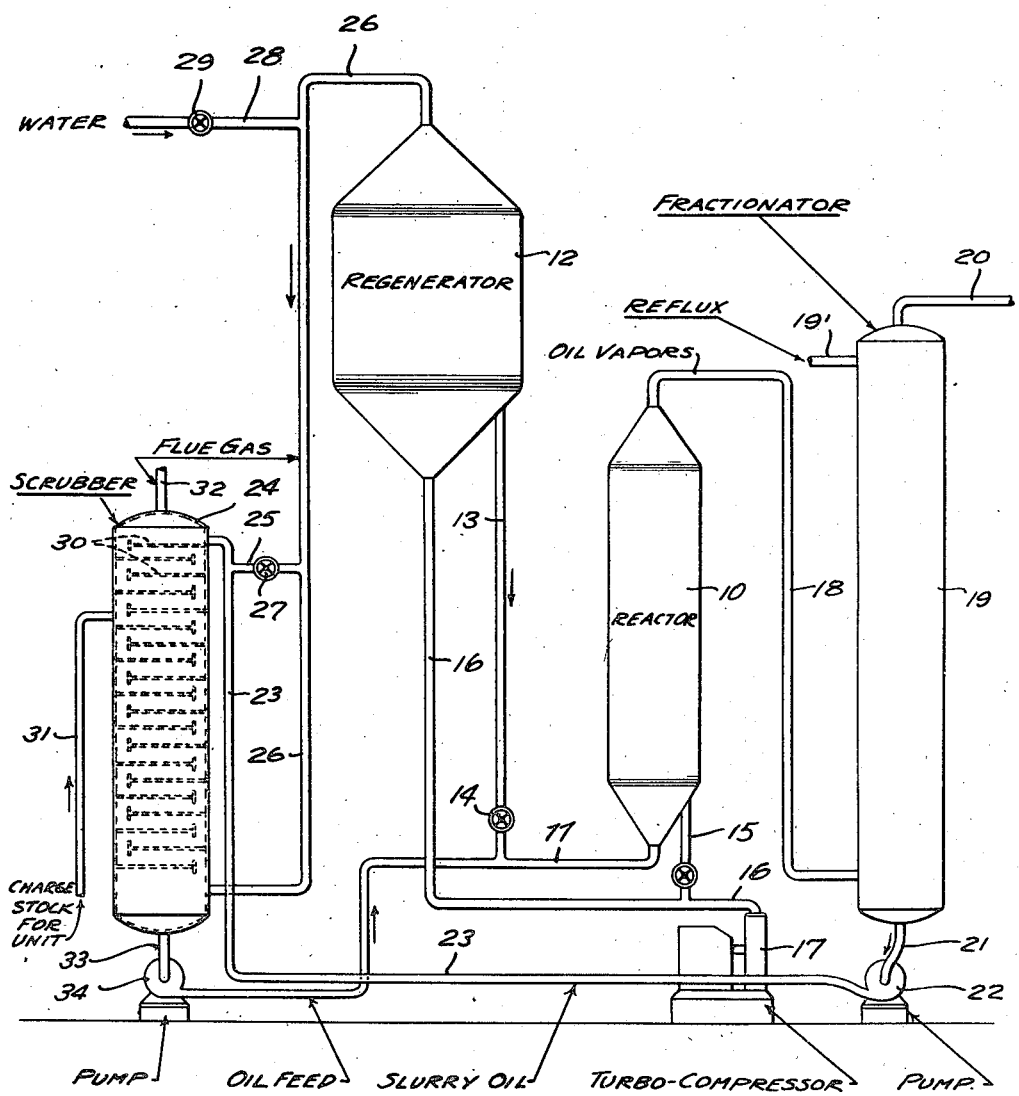
Figure 2:
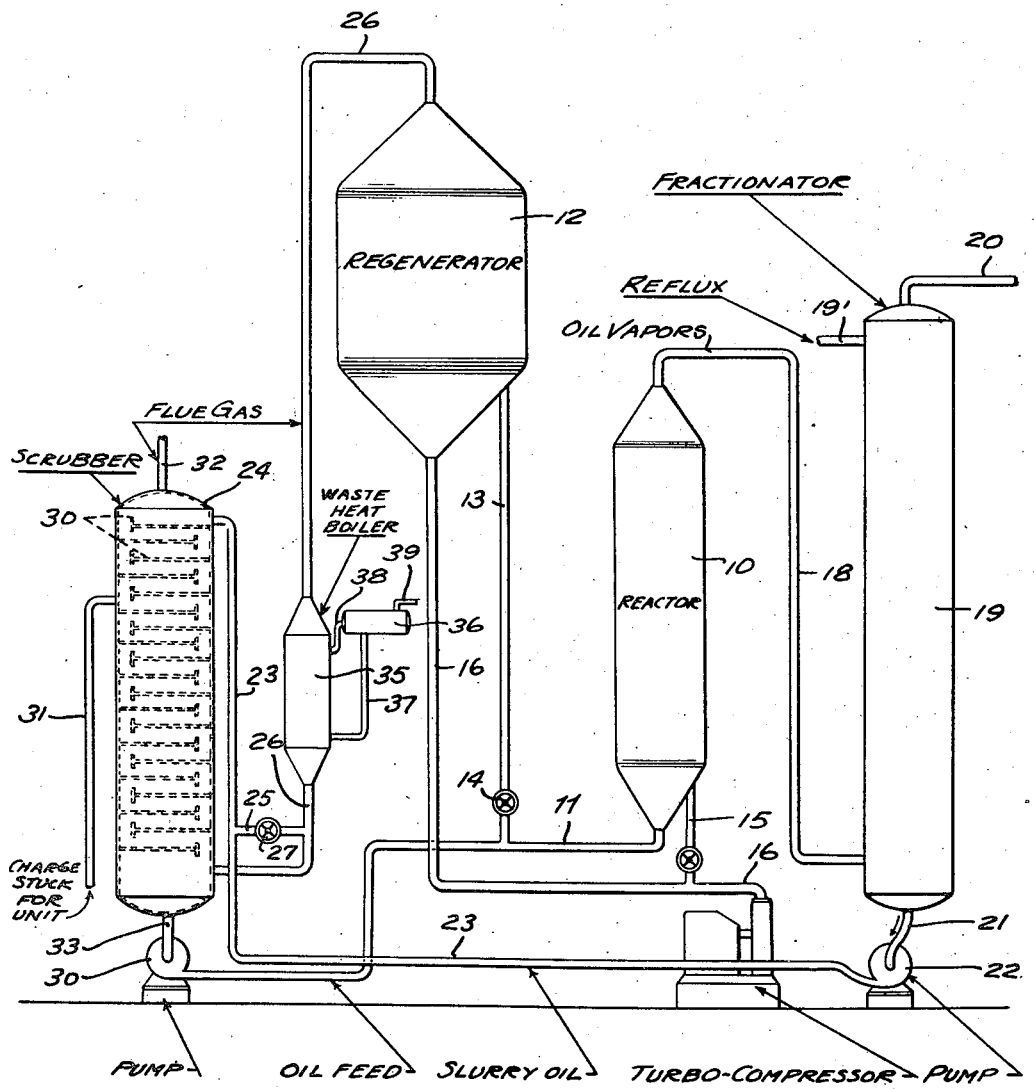

The invention will be understood from the following description when considered in connection with the accompanying drawing forming a part thereof and in which:

Fig. 1 is a flow diagram of the fluid catalytic cracking apparatus of the present invention, and Fig. 2 is a view similar to Fig. 1 but of another embodiment of the invention.

Like characters of reference refer to the same parts throughout the views.

Referring to Fig. 1 of the drawing, the reference numeral 10 designates a reactor into which oil stock and a hot catalyst are injected through the feed line 11. The hot catalyst flows from the regenerator 12 into the feed line 11 through the regenerated catalyst line 13 which is controlled by valve 14. Spent catalyst is conveyed from the reactor 10 to the regenerator 12 through the spent catalyst lines 15 and 16 by a current of

2 regeneration air under pressure supplied to the line 16 by the turbo-compressor 17. Cracked vapors pass overhead from the reactor 10 into a vapor conduit 18 which conduit is in communication with the lower part of a fractionator 19. The oil vapors pass upwardly in the fractionator 19 countercurrent to and in contact with reflux entering the fractionator 19 through the pipe 19' and flowing downwardly from the upper part of the fractionator, the overhead vapors flowing through the pipe 20 at the top of the fractionator to a condenser and to a gas separator, not shown. Slurry oil, which is obtained as a bottoms product from the fractionator and which contains suspended catalyst material recovered from the lower section of the fractionating column, is pumped from the bottom of the fractionator 19 through line 21 by pump 22 and thereafter passed through conduit 23, a part thereof passing to the upper portion of a scrubber 24 and another part passing into and through conduit 25 connected between conduit 23 and the flue gas pipe 26. The conduit 25 is controlled by the valve 27. Pipe 26 is in communication with the regenerator 12 so as to receive flue gases therefrom and is also in communication with the scrubber 24 at the lower part thereof. Between the points of connection of the pipe 26 with the regenerator and with the conduit 25, a water pipe 28 is connected to the pipe 26. The water pipe 28 is controlled by a valve 29.

Scrubber 24 comprises a tower having a plurality of trays 30 therein suitable for obtaining liquid and vapor contact. Charge stock is conducted to a point intermediate the top and bottom of the scrubber 24 through the line 31. Flue gas flows from the top of the scrubber tower through the pipe 32 while a bottoms product, comprising scrubber oil with a concentration of catalyst is withdrawn from the bottom of the scrubber through a pipe 33 by a pump 34 which pumps the bottoms product into the reactor 10 through the line 11.

In operation of the form of the invention shown in Fig. 1, slurry oil containing suspended catalyst material is pumped from the bottom of the fractionator and into the line 23 from which line a predetermined portion of the slurry oil flows through the conduit 25 and is injected into pipe 26 through which hot flue gases from the regenerator 12, which gases have catalyst entrained therein, flow. The slurry oil is vaporized by contact with the flue gases, the vapor so formed flowing with the flue gases and entrained catalyst into the lower part of the scrubber 24.

The vapor flowing into the scrubber 24 through the pipe 26 is cooled and condensed in the scrubber by passing upwardly therein and in contact in the trays 30 with the charge stock flowing into the scrubber through the line 31 which feed stock flows downwardly over the trays 30. The feed stock is the principal cooling and scrubbing medium in the scrubber 24.

In order to recover substantially 100% of the catalyst fines from the mixture flowing into the lower part of the scrubber 24 through the pipe 26, it is necessary that extremely fine liquid droplets be formed which droplets act as agglomerating nuclei for the fine catalyst dust. The nuclei required for agglomeration are formed, in the present invention, by the cooling and condensation in the scrubber of the mixture flowing thereinto through pipe 26. The desired concentration of liquid droplets which act as agglomerating nuclei for the catalyst fines is obtained by controlling the amount of slurry oil injected through the branch conduit 25 into the pipe 26. The valve 27 in the conduit 25 is so set that the amount of slurry oil injected into the pipe 26 will supply vapor which forms the desired concentration of infinitesimally small nuclei by which substantially 100% of the catalyst fines will be recovered through condensation of the vapor in the scrubber oil which is fed to the reactor through the pipe 33, pump 34, and oil feed line 11.

Introduction of the flue gases together with the vaporized slurry oil into the scrubber will preheat the raw oil charge for the unit which charge enters the scrubber through the line 31. Inasmuch as the raw oil charge will generally have a low initial boiling point, for example, a boiling point of substantially 350° F., a portion of the oil will be vaporized by contact with the hot gases. As shown, the oil thusly vaporized is recovered by absorption with the heavy slurry oil which enters the upper part of the scrubber 24 through the conduit 23 and passes downwardly over the trays 30.

As shown in Fig. 1, the preheat temperature of the raw oil charge may be controlled by the injection of a cooling medium such as water into the flue gas conduit 26 through the water pipe 28 to reduce the temperature of said gases. The preheat temperature of the raw oil stock will be determined by the distillation range of the stock, the stock generally being heated to the maximum temperature allowable without vaporization.

In the form of the invention shown in Fig. 2, the preheat temperature of the raw oil charge is controlled by passing the flue gases flowing in the pipe 26 from the regenerator 12 through a waste heat boiler 35 into which water is introduced from a drum 36 through a line 37. Steam flows from the boiler 35 to the drum 36 through the conduit 38 and is withdrawn from the drum through the line 39. The operation of the form of the invention shown in Fig. 2 is otherwise similar to that of the form shown in Fig. 1.

From the foregoing, it will be perceived that the invention provides a method and apparatus by means of which substantially 100% of the catalyst used in a unit for the fluid catalytic cracking of a composite liquid is recovered and in which the charge stock used in the unit may be heated to a desired temperature by flue gases from the regenerator.

Various changes may be made in the form, location and relative arrangement of the several parts of the apparatus disclosed and in the sequence of the steps in the method disclosed without departing from the principles of the invention. Accordingly, the invention is not to be limited excepting by the scope of the appended claims.

What is claimed is:

1. The method of recovering catalyst used in catalytic conversion processes which comprises vaporizing in flue gases from a catalyst regenerating zone, which gases have catalyst entrained therein, a liquid product produced in a fractionating zone from vapors of a composite liquid, flowing said vaporized liquid product and gases into a cooling and scrubbing zone, and cooling and scrubbing the vaporized liquid product and gases in said zone with composite liquid to be catalytically converted.

2. The method of recovering catalyst used in catalytic conversion processes which comprises vaporizing in flue gases from a catalyst regenerating zone, which gases have catalyst entrained therein, a liquid product produced in a fractionating zone from vapors of a composite liquid, which product has catalyst entrained therein, flowing said vaporized liquid product and gases into a cooling and scrubbing zone, and cooling and scrubbing the vaporized liquid product and gases in said zone with composite liquid to be catalytically converted.

3. The method of recovering catalyst used in catalytic conversion processes which comprises vaporizing in flue gases from a catalyst regenerating zone, which gases have catalyst entrained therein, a liquid product produced in a fractionating zone from vapors of a composite liquid, flowing said vaporized liquid product and gases into a cooling and scrubbing zone wherein liquid droplets are formed from the vapor, said droplets acting as an agglomerating nuclei for the catalyst entrained in said gases, cooling and scrubbing the vaporized liquid product and gases in said zone with composite liquid to be catalytically converted, and controlling the amount of said liquid product vaporized to secure from said vapor the desired concentration of liquid droplets in the cooling and scrubbing zone.

4. The method of recovering catalyst used in the fluid catalytic cracking of hydrocarbon oil which comprises vaporizing slurry oil from a fractionating zone, which oil has catalyst entrained therein, in flue gases from a regenerating zone, which gases have catalyst entrained therein, flowing said vapor and gases into a cooling and scrubbing zone, cooling and scrubbing the vapors and gases in said zone with hydrocarbon oil to be cracked, and catalytically cracking hydrocarbon oil used for cooling and scrubbing said vapors and gases in a reacting zone.

5. The method of recovering catalyst used in the fluid catalytic cracking of hydrocarbon oil which comprises vaporizing slurry oil from a fractionating zone, which oil has catalyst entrained therein, in flue gases from a regenerating zone, which gases have catalyst entrained therein, flowing said vapor and gases into a cooling and scrubbing zone wherein liquid droplets are formed from the vapor, said droplets acting as agglomerating nuclei for the catalyst entrained in said gases, cooling and scrubbing the vapors and gases in said zone with hydrocarbon oil to be cracked, controlling the quantity of slurry oil vaporized to secure from said vapor the desired concentration of liquid droplets in the cooling and scrubbing zone, and catalytically cracking hydrocarbon oil used for cooling and scrubbing said vapors and gases in a reacting zone.

6. The method of recovering catalyst used in catalytic conversion processes which comprises vaporizing in flue gases from a catalyst regenerating zone, which gases have catalyst entrained therein, one portion of a liquid product produced in a fractionating zone from vapors of a composite liquid, flowing said vaporized liquid product and gases into a cooling and scrubbing zone, and cooling and scrubbing the vaporized liquid product and gases in said zone with composite liquid to be catalytically converted and with another portion of said liquid product produced in the fractionating zone.

7. The method of recovering catalyst used in catalytic conversion processes which comprises vaporizing in flue gases from a catalyst regenerating zone, which gases have catalyst entrained therein, a liquid product produced in a fractionating zone from vapors of a composite liquid, flowing said vaporized liquid product and gases into a cooling and scrubbing zone, cooling and scrubbing the vaporized liquid product and gases in said zone with composite liquid to be catalytically converted, and heating said composite liquid to be catalytically converted by contact with the vapors and gases in said cooling and scrubbing zone.

8. The method of recovering catalyst used in catalytic conversion processes which comprises vaporizing in flue gases from a catalyst regenerating zone, which gases have catalyst entrained therein, a liquid product produced in a fractionating zone from vapors of a composite liquid, flowing said vaporized liquid product and gases into a cooling and scrubbing zone, cooling and scrubbing the vaporized liquid product and gases in said zone with composite liquid to be catalytically converted, heating said composite liquid to be catalytically converted by contact with the vapors and gases in said cooling and scrubbing zone, and controlling the temperature to which the composite liquid is heated by injecting a cooling medium into the flue gases from the regenerating zone.

9. The method of recovering catalyst used in catalytic conversion processes which comprises vaporizing in flue gases from a catalyst regenerating zone, which gases have catalyst entrained therein, one portion of a liquid product produced in a fractionating zone from vapors of a composite liquid, flowing said vaporized liquid product and gases into a cooling and scrubbing zone, cooling and scrubbing the vaporized liquid product and gases in said zone with composite liquid to be catalytically converted, heating said composite liquid by contact with the vaporized liquid product and gases in said cooling and scrubbing zone, absorbing vapors created by heating of said composite liquid in another portion of said liquid product, and catalytically converting said other portion of said liquid product and composite liquid used in cooling and scrubbing said vapor and gases.

10. The method of recovering catalyst used in the fluid catalytic cracking of hydrocarbon oil which comprises vaporizing a portion of the slurry oil from a fractionating zone, which oil has a catalyst entrained therein, by contacting said portion of the slurry oil with flue gases from a regenerating zone flowing the vaporized slurry oil and said gases into a cooling and scrubbing zone wherein liquid droplets are formed from the vapor, said droplets acting as agglomerating nuclei for the catalyst entrained in said gases, cooling and scrubbing the vapors and gases in said zone with hydrocarbon oil to be cracked, controlling the quantity of slurry oil vaporized to secure from said vapor the desired concentration of liquid droplets in the cooling and scrubbing zone, heating said hydrocarbon oil to be cracked by contact with the vapors and gases in the cooling and scrubbing zone, introducing another portion of the slurry oil into the cooling and scrubbing zone, absorbing vapors created by heating the hydrocarbon oil to be cracked in the other portion of the slurry oil, flowing into a reaction zone a hot catalyst together with a mixture of slurry oil and condensate which slurry oil was used in cooling said vapors and in absorbing vapor created by heating said hydrocarbon oil to be cracked and which condensate was formed by cooling the vaporized slurry oil and oil to be cracked, passing vapors from the reacting zone into the fractionating zone, and regenerating the spent catalyst from the reacting zone in the regenerating zone.

11. The method of recovering catalyst used in the fluid catalytic cracking of hydrocarbon oil which comprises vaporizing a portion of the slurry oil from a fractionating zone, which oil has a catalyst entrained therein, by contacting said portion of the slurry oil with flue gases from a regenerating zone flowing the vaporized slurry oil and said gases into a cooling and scrubbing zone wherein liquid droplets are formed from the vapor, said droplets acting as agglomerating nuclei for the catalyst entrained in said gases, cooling and scrubbing the vapors and gases in said zone with hydrocarbon oil to be cracked, controlling the quantity of slurry oil vaporized to secure from said vapor the desired concentration of liquid droplets in the cooling and scrubbing zone, heating said hydrocarbon oil to be cracked by contact with the vapors and gases in the cooling and scrubbing zone, controlling the temperature of the gases from the regenerating zone by injecting a cooling medium into said flue gases, introducing another portion of the slurry oil into the cooling and scrubbing zone, absorbing vapors created by heating the hydrocarbon oil to be cracked in the other portion of the slurry oil, flowing into a reaction zone a hot catalyst together with a mixture of slurry oil and condensate which slurry oil was used in cooling said vapors and in absorbing vapor created by heating said hydrocarbon oil to be cracked and which condensate was formed by cooling the vaporized slurry oil and oil to be cracked, passing vapors from the reacting zone into the fractionating zone, and regenerating the spent catalyst from the reacting zone in the regenerating zone.

12. The method of recovering catalyst used in the fluid catalytic cracking of hydrocarbon oil which comprises vaporizing a portion of the slurry oil from a fractionating zone, which oil has a catalyst entrained therein, by contacting said portion of the slurry oil with flue gases from a regenerating zone flowing the vaporized slurry oil and said gases into a cooling and scrubbing zone wherein liquid droplets are formed from the vapor, said droplets acting as agglomerating nuclei for the catalyst entrained in said gases, cooling and scrubbing the vapors and gases in said zone with hydrocarbon oil to be cracked, controlling the quantity of slurry oil vaporized to secure from said vapor the desired concentration of liquid droplets in the cooling and scrubbing zone, heating said hydrocarbon oil to be cracked by contact with the vapors and gases in the cooling and scrubbing zone, flowing the gases from the regenerating zone through a steam generating zone to generate steam therein and thereby control the temperature of the flue gases, introducing another portion of the slurry oil into the cooling and scrubbing zone, absorbing vapors created by heating the hydrocarbon oil to be cracked in the other portion of the slurry oil, flowing a hot catalyst into a reaction zone together with a mixture of slurry oil and condensate which slurry oil was used in cooling said vapors and in absorbing vapor created by heating said hydrocarbon oil to be cracked and which condensate was formed by cooling the vaporized slurry oil and oil to be cracked, passing vapors from the reacting zone into the fractionating zone, and regenerating the spent catalyst from the reacting zone in the regenerating zone.

13. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting composite fluid to be converted to the scrubber, means for conducting flue gases containing entrained catalyst from the regenerator to the scrubber, means for conducting a liquid product from the fractionator to the flue gas conducting means wherein said liquid product is vaporized by the flue gases, liquid and vapor contact means in the scrubber in which said composite liquid and said vapor and gases are brought into contact thereby cooling and scrubbing said vapor and gases in said composite liquid, and means through which composite liquid used for scrubbing and cooling said vapor and gases is conducted from the scrubber to the reactor.

14. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting the composite fluid to be converted to the scrubber, other means through which flue gases containing entrained catalyst are conducted from the regenerator to the scrubber, means for conducting a liquid product containing entraining catalyst from the fractionator into contact with flue gases flowing from the regenerator to the scrubber through said other means to vaporize said liquid product by the flue gases, liquid and vapor contact means in the scrubber in which said composite liquid and said vapor and gases are brought into contact thereby cooling and scrubbing said vapor and gases in said composite liquid, and means through which composite liquid used for scrubbing and cooling said vapor and gases is conducted from the scrubber to the reactor.

15. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting the composite fluid to be converted to the scrubber, other means through which flue gases containing entrained catalyst are conducted from the regenerator to the scrubber, means for conducting a liquid product containing entrained catalyst from the fractionator into contact with flue gases flowing from the regenerator to the scrubber through said other means to vaporize said liquid product by the flue gases, liquid and vapor contact means in the scrubber in which said composite liquid and said vapor and gases are brought into contact thereby cooling and scrubbing said vapor and gases in said composite liquid, the vapor upon cooling forming liquid droplets which act as agglomerating nuclei for the catalyst entrained in the gases, means for controlling the amount of said liquid product vaporized in said flue gases to secure from said vapor the desired concentration of liquid droplets in the scrubber, and means through which composite liquid used for scrubbing and cooling said vapor and gases is conducted from the scrubber to the reactor.

16. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting the composite fluid to be converted to the scrubber, means for conducting flue gases containing entrained catalyst from the regenerator to the scrubber, other means through which a liquid product containing entrained catalyst is conducted from the fractionator into contact with flue gases flowing from the regenerator to the scrubber through said other means to vaporize said liquid product by the flue gases, liquid and vapor contact means in the scrubber in which said composite liquid and said vapor and gases are brought into contact thereby cooling and scrubbing said vapor and gases in said composite liquid and thereby heating said liquid, a conduit through which a cooling medium is introduced into the flue gas conducting means, means for controlling the amount of cooling medium introduced into the flue gases to control the temperature thereof and thereby control the degree to which the composite fluid to be converted is heated, and means through which composite liquid used for scrubbing and cooling said vapor and gases is conducted from the scrubber to the reactor.

17. In apparatus for the catalytic conversion of hydrocarbon oil, a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber comprising a tower, vapor and liquid contacting apparatus in the tower, conduit means in communication with the scrubber to conduct hydrocarbon oil to be cracked to the upper part of the tower, a flue gas conduit in communication with the regenerator and the lower part of the scrubbing tower and through which flue gases having catalyst entrained therein flow from the regenerator to the scrubber, a slurry oil conduit in communication with the fractionator and the flue gas conduit through which slurry oil from the fractionator having catalyst entrained therein is passed to the flue gas conduit wherein said slurry oil is vaporized by the flue gases, the arrangement being such that vapor and gases from the flue gas conduit flowing upwardly in the vapor and liquid contact apparatus are cooled and scrubbed in said apparatus by contact with the hydrocarbon oil to be converted flowing downwardly in said liquid and vapor contact apparatus, and conduit means in communication with the lower part of the scrubbing tower and the reactor and through which hydrocarbon oil used in cooling and scrubbing the vapors and gases is conducted to the reactor.

18. In apparatus for the catalytic conversion of hydrocarbon oil, a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber comprising a tower, vapor and liquid contacting apparatus in the tower, conduit means in communication with the scrubber to conduct hydrocarbon oil to be cracked to the upper part of the tower, a flue gas conduit in communication with the regenerator and the lower part of the scrubbing tower and through which flue gases having catalyst entrained therein flow from the regenerator to the scrubber, slurry oil conducting means in communication with the fractionator, the flue gas conduit and the upper part of the scrubbing tower at a point above that at which the hydrocarbon oil to be converted is introduced into the tower and through which slurry oil from the fractionator having catalyst entrained therein is passed to the flue gas conduit and to the upper part of the scrubbing tower, means for controlling the quantity of slurry oil introduced into said flue gas conduit, the arrangement being such that vapor and gases from the flue gas conduit flowing upwardly in the vapor and liquid contact apparatus are cooled and scrubbed in said apparatus by contact with the hydrocarbon oil to be converted flowing downwardly in said liquid and vapor contact apparatus and the hydrocarbon oil to be converted is preheated by said contact, and conduit means in communication with the lower part of the scrubbing tower and the reactor and through which hydrocarbon oil used in cooling and scrubbing the vapors and gases is conducted to the reactor.

19. In apparatus for the catalytic conversion of hydrocarbon oil, a fractionator, a reactor, means for conducting oil vapors from the reactor to the fractionator, a regenerator, means for conducting spent catalyst to the regenerator, a scrubber comprising a tower, vapor and liquid contacting apparatus in the tower, conduit means in communication with the scrubber to conduct hydrocarbon oil to be cracked to the upper part of the tower, a flue gas conduit in communication with the regenerator and the lower part of the scrubbing tower and through which flue gases having catalyst entrained therein flow from the regenerator to the scrubber, slurry oil conducting means in communication with the fractionator, the flue gas conduit and the upper part of the scrubbing tower at a point above that at which the hydrocarbon oil to be converted is introduced into the tower and through which slurry oil from the fractionator having catalyst entrained therein is passed, means for controlling the quantity of slurry oil introduced into said flue gas conduit, the arrangement being such that vapor and gases from the flue gas conduit flowing upwardly in the vapor and liquid contact apparatus are cooled and scrubbed in said apparatus by intimate contact with the hydrocarbon oil to be converted flowing downwardly in said liquid and vapor contact apparatus and the hydrocarbon oil to be converted is preheated by said contact, a conduit through which a cooling medium is introduced into the flue gas conducting means, means for controlling the amount of cooling medium introduced into the flue gases to control the temperature thereof and thereby control the degree to which the hydrocarbon oil to be converted is heated, conduit means in communication with the lower part of the scrubbing tower and the reactor and through which hydrocarbon oil used in cooling and scrubbing the vapors and gases is conducted to the reactor, and regenerated catalyst conduit means in communication with the regenerator and the last-mentioned conduit means for conducting regenerated catalyst into said last-mentioned conduit means.

20. In apparatus for the catalytic conversion of hydrocarbon oil, a fractionator, a reactor, means for conducting oil from the reactor vapors to the fractionator, a regenerator, means for conducting spent catalyst to the regenerator, a scrubber comprising a tower, vapor and liquid contacting apparatus in the tower, conduit means in communication with the scrubber to conduct hydrocarbon oil to be cracked to the upper part of the tower, a heat exchanger, a flue gas conduit in communication with the heat exchanger and the regenerator through which flue gases from the regenerator having catalyst entrained therein flow to the heat exchanger, another flue gas conduit in communication with the heat exchanger and the lower part of the scrubbing tower through which cooled gases flow from the heat exchanger to the scrubbing tower, slurry oil conducting means in communication with the fractionator, said other flue gas conduit and the upper part of the scrubbing tower at a point above that at which the hydrocarbon oil to be converted is introduced into the tower and through which slurry oil from the fractionator having catalyst entrained therein is passed, means for controlling the quantity of slurry oil introduced into said flue gas conduit, the arrangement being such that vapor and gases from the flue gas conduit flowing upwardly in the vapor and liquid contact apparatus are cooled and scrubbed in said apparatus by intimate contact with the hydrocarbon oil to be converted flowing downwardly in said liquid and vapor contact apparatus and the hydrocarbon oil to be converted is preheated by said contact, conduit means in communication with the lower part of the scrubbing tower and the reactor and through which hydrocarbon oil used in cooling and scrubbing the vapors and gases is conducted to the reactor, and regenerated catalyst conduit means in communication with the regenerator and the last-mentioned conduit means for conducting regenerated catalyst into said last-mentioned conduit means.

21. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting composite fluid to be converted to the scrubber, other means through which flue gases containing entrained catalyst are conducted from the regenerator to the scrubber, means for conducting a liquid product from the fractionator into contact with flue gases flowing from the regenerator to the scrubber through said other means to vaporize said liquid product by the flue gases, liquid and vapor contact means in the scrubber in which said composite liquid and said vapor and gases are brought into contact thereby cooling and scrubbing said vapor and gases in said composite liquid, and means through which composite liquid used for scrubbing and cooling said vapor and gases is conducted from the scrubber to the reactor.

22. The method of recovering catalyst used in catalytic conversion processes which comprises vaporizing in flue gases from a catalyst regenerating zone, which gases have catalyst entrained therein, a liquid product produced in a fractionating zone from vapors of a composite liquid, flowing said vaporized liquid product and gases into a cooling and scrubbing zone, cooling and scrubbing the vaporized liquid product and gases in said zone with composite liquid to be catalytically converted, heating said composite liquid to be catalytically converted by contact with the vapors and gases in said cooling and scrubbing zone, and controlling the temperature to which the composite liquid is heated by controlling the temperature of the flue gases from the regenerating zone.

23. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting the composite fluid to be converted to the scrubber, other means through which flue gases containing entrained catalyst are conducted from the regenerator to the scrubber, means for conducting a liquid product containing entrained catalyst from the fractionator into contact with flue gases flowing from the regenerator to the scrubber through said other means to vaporize said liquid product by the flue gases, liquid and vapor contact means in the scrubber in which said composite liquid and said vapor and gases are brought into contact thereby cooling and scrubbing said vapor and gases in said composite liquid and heating said liquid, the vapor upon cooling forming liquid droplets which act as agglomerating nuclei for the catalyst entrained in the gases, means for controlling the amount of said liquid product vaporized in said flue gases to secure from said vapor the desired concentration of liquid droplets in the scrubber, a cooling medium conduit in communication with said other means through which flue gases are conducted from the regenerator, the cooling medium from the cooling medium conduit and said flue gases flowing from the regenerator to the scrubber passing through said other means in heat exchange relationship, means for controlling the amount of cooling medium passed in heat exchange relationship with said flue gases to control the temperature thereof and thereby control the degree to which the composite fluid to be converted is heated, and means through which composite liquid used for scrubbing and cooling said vapor and gases is conducted from the scrubber to the reactor.

24. In apparatus for the catalytic conversion of a composite fluid comprising a reactor, a fractionator, and a regenerator, the reactor, fractionator and regenerator being so connected that oil vapors are conducted from the reactor to the fractionator, spent catalyst is conducted from the reactor to the regenerator and regenerated catalyst is conducted from the regenerator to the reactor, a scrubber, means for conducting composite fluid to be converted to the scrubber, other means through which flue gases containing entrained catalyst are conducted from the regenerator to the scrubber, means for conducting a liquid product from the fractionator into the scrubber and into contact with flue gases flowing from the regenerator to the scrubber through said other means to vaporize said liquid product by the flue gases, means for controlling the amount of said liquid product passed to the scrubber and passed to said other means, liquid and vapor contact means in the scrubber in which said composite liquid, liquid product and said vapor and gases are brought into contact thereby cooling and scrubbing said vapor and gases in said composite liquid and liquid product, and means through which the composite liquid and liquid product used for scrubbing and cooling said vapor and gases is conducted from the scrubber to the reactor.

EDWARD M. VAN DORNICK.

REFERENCES CITED

The following references are of record in the file of this patent:

UNITED STATES PATENTS

| Number | Name | Date |
| --- | --- | --- |
| 2,273,075 | Weems | Feb. 17, 1942 |
| 2,273,076 | Voorhees | Feb. 17, 1942 |
| 2,302,209 | Goddin | Nov. 17, 1942 |
| 2,303,680 | Brueckmann | Dec. 1, 1942 |
| 2,311,978 | Conn | Feb. 23, 1943 |
| 2,328,325 | Butikofer | Aug. 31, 1943 |

Certificate of Correction

Patent No. 2,429,247.  October 21, 1947.

EDWARD M. VAN DORNICK

It is hereby certified that errors appear in the printed specification of the above numbered patent requiring correction as follows: Column 7, line 54, claim 14, for "entraining" read *entrained*; column 10, line 24, after "reactor" strike out the word "vapors" and insert the same after "oil" same line; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*